United States Patent [19]

Tamburelli

[11] Patent Number: 4,504,958
[45] Date of Patent: Mar. 12, 1985

[54] EQUALIZER FOR THE CORRECTION OF DIGITAL SIGNALS

[75] Inventor: Giovanni Tamburelli, Turin, Italy

[73] Assignee: CSELT - Centro Studi e Laboratori Telecomunicazioni S.P.A., Turin, Italy

[21] Appl. No.: 448,741

[22] Filed: Dec. 10, 1982

[30] Foreign Application Priority Data

Jan. 15, 1982 [IT] Italy .............................. 67039 A/82

[51] Int. Cl.$^3$ ............................................ H04B 3/14
[52] U.S. Cl. ..................................... 375/12; 333/28 R
[58] Field of Search ............... 375/12, 14, 15; 333/18, 333/28; 364/724; 381/103

[56] References Cited

U.S. PATENT DOCUMENTS

| 4,097,807 | 6/1978 | Fujimura | 375/14 |
| 4,170,758 | 10/1979 | Tamburelli | 375/12 |
| 4,283,788 | 8/1981 | Tamburelli | 375/14 |
| 4,288,872 | 9/1981 | Tamburelli | 375/14 |

OTHER PUBLICATIONS

Article entitled "Digital Receiver with Distributed and Integrated Decision Feedback...", by G. Tamburelli—Dec. 1976.

*Primary Examiner*—Benedict V. Safourek
*Attorney, Agent, or Firm*—Karl F. Ross; Herbert Dubno

[57] ABSTRACT

An equalizer designed to correct both precursor and postcursor distortion in signal samples periodically obtained from a train of digital symbols comprises two parallel circuit branches each including a delay line preceded by a linear upstream filter for postcursor suppression in the case of the first branch and precursor suppression in the case of the second branch. A decision stage in parallel with the delay line of the first branch works into a nonlinear downstream filter delivering a precursor-correcting signal to an adder which also receives precorrected earlier signals from the two delay lines. A second decision stage connected to an output of the adder feeds back to that adder a postcursor-correction signal via another nonlinear downstream filter. The purged signal emitted by the second decision stage may be subjected to additional filtering and precursor/postcursor correction with the aid of another adder and a third decision stage provided with a further feedback loop.

7 Claims, 2 Drawing Figures

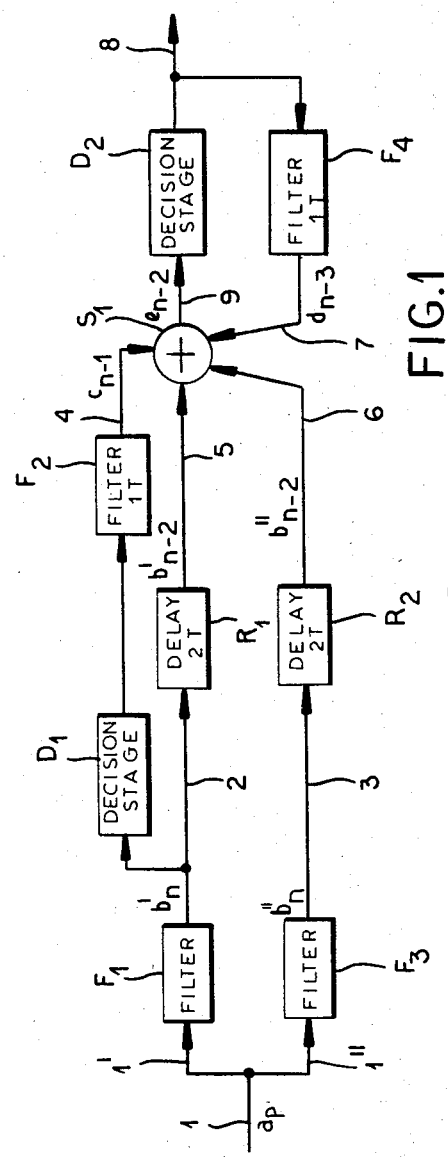
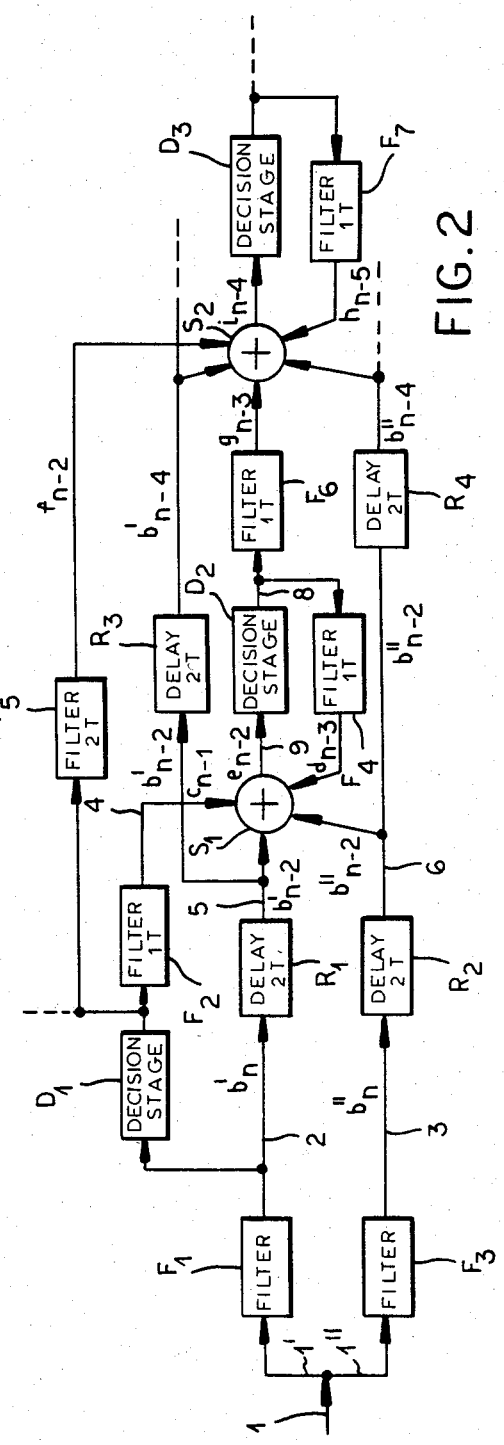
FIG.1
FIG.2

EQUALIZER FOR THE CORRECTION OF DIGITAL SIGNALS

FIELD OF THE INVENTION

My present invention relates to an equalizer to be used in a telecommunication system for the correction of digital signals at the receiving end of a transmission path.

BACKGROUND OF THE INVENTION

In my prior U.S. Pat. No. 4,288,872 I have disclosed such an equalizer, designed to enable transmission at speeds greater than twice Nyquist's rate, which includes linear and nonlinear filters for suppressing spurious oscillations of both the precursor and the postcursor type. Equalizers of the nonlinear kind compensating both precursor and postcursor effects are also the subject matter of my prior U.S. Pat. Nos. 4,170,758 and 4,283,788.

The equalizer particularly described and claimed in U.S. Pat. No. 4,288,872 comprises a first and a second circuit branch connected in parallel to the receiving end of a transmission path carrying a periodically sampled train of incoming digital signals or symbols. The first circuit branch includes a linear upstream filter for the partial suppression of postcursor effects, a first signal thus prefiltered being fed to a threshold-type decision stage and in parallel therewith to a delay line. The threshold circuit or decision stage emits a first quantized pulse to a nonlinear first downstream filter working into a first adder which also receives from the delay line the first prefiltered signal with a relative retardation of one sampling period. The first downstream filter emits a feed-forward signal serving to compensate precursor distortion in the delayed first prefiltered signal so that the first adder produces a first corrected signal which is at least partially purged of both precursor and postcursor interference.

The second circuit branch also includes a linear upstream filter which partially suppresses precursor effects and delivers a second prefiltered signal to a second adder provided with a feedback loop which includes another threshold-type decision stage followed by a second nonlinear downstream filter. The feedback signal derived by the last-mentioned filter from a quantized pulse emitted by the preceding threshold circuit or decision stage compensates postcursor distortion in the second prefiltered signal to generate a second corrected signal, at least partially purged from precursor and postcursor interference, in the output of the second adder. The two purged signals are fed to respective inputs of a third adder or summing circuit, with interposition of another delay line between the second and third adders in order to insure the temporal correlation of these two signals. A final decision stage converts the sum of the two purged signals into a quantized output pulse.

As further disclosed in U.S. Pat. No. 4,288,872, this quantized output pulse can be subjected to additional filtering and distortion compensation by algebraic summing to achieve a still higher degree of interference suppression.

The use of parallel circuit branches for precursor and postcursor correction reduces the probability of error propagation through feedback. Even if an error should develop in one branch, the summing of its output signal to that of the other branch minimizes its detrimental effect since the same error is unlikely to occur in both branches simultaneously. Still, the final decision stage downstream of the summing circuit lies effectively in cascade with an upstream threshold circuit in each branch so that its performance depends on the precision with which these two upstream stages operate. The threshold circuit of the second branch is particularly troublesome in this context since the feedback loop tends to intensify any decision error arising there.

OBJECT OF THE INVENTION

The object of my present invention, therefore, is to provide an improved equalizer of the type just discussed, effectively suppressing both precursor and postcursor interference, in which the feedback loop in the second branch upstream of the final decision stage is eliminated.

SUMMARY OF THE INVENTION

An equalizer according to my present invention comprises, in accordance with one embodiment more particularly described hereinafter, a first and a second circuit branch with respective upstream filters connected in parallel to signal-receiving means as in my prior U.S. Pat. No. 4,288,872 and with a precursor-compensating downstream filter in the first branch but with omission of the second adder and its feedback loop in the second branch. A summing circuit, combining the functions of the first and third adders of the prior system, has an additional input connected to the output of the final decision stage via a feedback loop which contains a nonlinear second downstream filter that delivers a postcursor-compensating signal derived from the quantized pulse in the output of that stage.

A final decision unit with a feedback loop containing a postcursor-compensating filter working into a digital adder has been shown in FIG. 3 of my aforementioned U.S. Pat. No. 4,170,758. In that instance, however, the adder has only three inputs whereas the summing ciru- cit referred to above has four inputs respectively receiving the retarded first prefiltered signal from the delay line of the first circuit branch, the precursor-compensating signal from the first downstream filter in that branch, the retarded second prefiltered signal from the delay line of the second branch, and the postcursor-compensating signal from the second downstream filter included in the feedback loop of the final stage.

The threshold circuit or decision stage provided with that feedback loop could be followed, according to a further feature of my invention, by a third downstream filter working into another summing circuit or adder which also receives the prefiltered signals of the two circuit branches with additional retardations introduced by other delay lines in cascade with those already referred to. The overall retardation of the two prefiltered signals exceeds by one sampling period the lag introduced by the series combination of the four-way summing circuit, the following decision stage and the third downstream filter; the latter filter therefore emits another precursor-compensating signal to be algebraically added to the twice-delayed branch signals. The resulting sum signal is again passed through a decision stage with a postcursor-compensating feedback loop including a fourth downstream filter.

Precursors from signals following a given symbol by two or more sampling periods may be compensated in the second summing circuit or adder with the aid of a fifth downstream filter connected to the output of the threshold circuit or decision stage of the first branch either directly or by way of the first downstream filter.

BRIEF DESCRIPTION OF THE DRAWING

The above and other features of my invention will now be described in detail with reference to the accompanying drawing in which:

FIG. 1 is a block diagram of an improved equalizer according to my present invention; and FIG. 2 is a similar block diagram showing a more elaborate embodiment.

SPECIFIC DESCRIPTION

The equalizer shown in FIG. 1 comprises two circuit branches connected, as in U.S. Pat. No. 4,288,872, to the receiving end of a transmission path 1 carrying incoming digital signals with a recurrence period T. A nonillustrated clock-pulse extractor, shown in the prior patent, is connected to that transmission path to time the operations of the components described hereinafter. These components include two linear upstream filters $F_1$ and $F_3$ which are preferably of the transversal type and introduce delays dependent on the number of interfering postcursor and precursor constituents of adjacent symbols. These delays are assumed to be identical; otherwise a delay line would have to be inserted in series with one of the filters as explained in the prior patent. The delays are symbolized by the subscripts of a signal sample $a_p$ arriving over transmission path 1 and earlier samples $b'_n$, $b''_n$ concurrently present in the outputs of the two filters; letters n and p designate two time slots separated by a number of recurrence or sampling periods T. Through suitable choice of their fixed filtering coefficients, based on the predetermined distortion introduced by transmission path 1, components $F_1$ and $F_3$ respectively suppress postcursor and precursor effects.

An output lead 2 of filter $F_1$ extends on the one hand to a delay line $R_1$ and on the other hand to a threshold circuit or decision stage $D_1$ which generates quantized (e.g. binary) pulses from the prefiltered signal $b'_n$ appearing in the output of filter $F_1$. Stage $D_1$ feeds that quantized pulse to a nonlinear downstream filter $F_2$ emitting on a lead 4 a signal $C_{n-1}$ which lags the signal $b'_n$ by one period T. Delay line $R_1$ retards the signal $b'_n$ by an interval of 2T so as to generate a signal $b'_{n-2}$ on a lead 5 even as a signal $b''_{n-2}$ temporally correlate therewith is emitted on a lead 6 by a delay line $R_2$ of like retardation which receives the signal $b''_n$ on an output lead 3 of filter $F_3$. The three simultaneously present signals $b'_{n-2}$, $4 1_{n-2}$ and $c_{n-1}$ are delivered to a summing circuit $S_1$ which may be constituted by two cascaded adders, as in U.S. Pat. No. 4,288,872, and which generates a resulting signal $e_{n-2}$ fed on a lead 9 to a further decision stage $D_2$. The quantized pulse appearing on an output lead 8 of stage $D_2$ is fed back via a second downstream filter $F_4$ to a further input lead 7 of summing circuit or adder $S_1$ as a postcursor-compensating signal $d_{n-3}$, thus with a further delay 1T. The decided output pulse on lead 8 is therefore corrected for postcursors by linear and nonlinear filters $F_1$ and $F_4$ and for precursors by linear and nonlinear filters $F_3$ and $F_2$.

As will be readily apparent, a possible decision error in threshold circuit $D_2$ will be diluted by the superposition of signals $b'_{n-2}$, $b''_{n-2}$ and $c_{n-1}$ upon the feedback signal $d_{n-3}$. This compares favorably with the arrangement shown in my prior U.S. Pat. No. 4,288,872 where a feedback loop upstream of delay line $R_2$ tends to intensify a decision error introduced by a threshold circuit in that loop.

In the equalizer of FIG. 2 the configuration of FIG. 1 has been expanded to include another nonlinear downstream filter $F_6$ with an inherent delay 1T connected to the output of decision stage $D_2$ so as to generate a precursor-compensating signal $g_{n-3}$ fed to an input of a second adder or summing circuit $S_2$. The same adder receives prefiltered signals $b'_{n-4}$ and $b''_{n-4}$, representing signals $b'_{n-2}$ and $b''_{n-2}$ retarded by 2T in respective delay lines $R_3$ and $R_4$, along with another precursor-compensating signal $f_{n-2}$ from a nonlinear filter $F_5$ which is connected to the output of decision stage $D_1$ and operates with a delay 2T; it will be apparent that a similar signal could be generated by a filter with a delay 1T connected in cascade with filter $F_2$. Thus, the sum of signals $b'_{n-4}$ and $b''_{n-4}$ is purged from precursors of the immediately following sample by signal $g_{n-3}$ and of the sample next in line by signal $f_{n-2}$. The resulting sum signal $i_{n-4}$ reaches a decision stage $D_3$ whose final output pulse is fed back via a nonlinear downstream filter $F_7$ to a further input of adder $S_2$ as a postcursor-compensating signal $h_{n-5}$.

It will be seen that the final output pulse decided in stage $D_3$ has been corrected for precursor distortion by filters $F_2$, $F_3$ and $F_6$ as well as for postcursor distortion by filters $F_1$, $F_4$ and $F_7$, aside from the suppression of an additional precursor by filter $F_5$. If these triple corrections are not needed, filters $F_1$ and $F_2$ could be omitted in the system of FIG. 2 to simplify the circuitry and to reduce noise. With the aid of a further adder downstream of stage $D_3$, additional delay lines in cascade with components $R_3$ and $R_4$ as well as at least one other nonlinear filter inserted between stage $D_1$ and that adder (possibly in cascade with filter $F_5$), precursors of a sample removed by three or more periods T from a decided symbol could be compensated.

I claim:

1. An equalizer for eliminating the effects of postcursor and precursor interference from a periodically sampled train of incoming digital signals, comprising:

receiving means connected to a transmission path carrying said incoming signals;

a first circuit branch connected to said receiving means, said first branch including first upstream filter means for converting a given signal sample into a first linearly prefiltered signal with at least partial suppression of postcursor effects, first threshold means connected to said first upstream filter means for deriving a first quantized pulse from said first prefiltered signal, first downstream filter means connected to said first threshold means for generating a precursor-compensating signal from said first quantized pulse, and first delay means connected in parallel with said first threshold means to said first upstream filter means for emitting a first retarded signal corresponding to said first prefiltered signal;

a second circuit branch connected in parallel with said first circuit branch to said receiving means, said second branch including second upstream filter means for converting said given signal sample into a second linearly prefiltered signal with at least partial suppression of precursor effects, said second branch further including second delay means connected to said second upstream filter means for emitting a second retarded signal corresponding to said second prefiltered signal, the retardations introduced by said first and second delay means being identical and exceeding by one sampling period a lag introduced by the series combination of said first threshold means and said first downstream filter means;

summing means with inputs connected to said first and second delay means and to said first downstream filter means for receiving said first and second retarded signals and said precursor-compensating signal therefrom;

second threshold means connected to said summing means for deriving a second quantized pulse from the combination of signals received by said summing means; and second downstream filter means connected in a feedback loop between an output of said second threshold means and a further input of said summing means for delivering thereto a postcursor-compensating signal, derived from said second quantized pulse, with a delay of one sampling period.

2. An equalizer as defined in claim 1, further comprising:

third downstream filter means connected to said second threshold means for generating another precursor-compensating signal from said second quantized pulse;

third delay means in cascade with said first delay means for emitting a third retarded signal corresponding to said first prefiltered signal;

fourth delay means in cascade with said second delay means for emitting a fourth retarded signal corresponding to said second prefiltered signal, the retardations introduced by said third and fourth delay means being identical and exceeding by one sampling period a lag introduced by the series combination of said summing means, said second threshold means and said third downstream filter means; adding means with inputs connected to said third and fourth delay means and to said third downstream filter means for receiving said third and fourth retarded signals and said other precursor-compensating signal therefrom;

third threshold means connected to said adding means for deriving a third quantized pulse from the combination of signals received by said adding means; and fourth downstream filter means connected in a feedback loop between an output of said third threshold means and a further input of said adding means for delivering thereto another postcursor-compensating signal, derived from said third quantized pulse, with a delay of one sampling period.

3. An equalizer as defined in claim 2, further comprising fifth downstream filter means inserted between said first threshold means and an additional input of said adding means for delivering thereto yet a further precursor-compensating signal derived from said first quantized pulse, the retardation introduced by the cascaded first and third delay means exceeding by two sampling periods a lag introduced by the series combination of said first threshold means and said fifth downstream filter means.

4. An equalizer for eliminating the effects of postcursor and precursor interference from a periodically sampled train of incoming digital signals, comprising:

receiving means connected to a transmission path carrying said incoming signals;

a first circuit branch including first threshold means connected to said receiving means for deriving a first quantized pulse from a given signal sample, first downstream filter means connected to said first threshold means for generating a precursor-compensating signal from said first quantized pulse, and first delay means connected in parallel with said first threshold means to said receiving means for emitting a first retarded signal corresponding to said given signal sample;

a second circuit branch connected in parallel with said first circuit branch to said receiving means, said second branch including upstream filter means for converting said given signal sample into a linearly prefiltered signal with at least partial suppression of precursor effects, said second branch further including second delay means connected to said upstream filter means for emitting a second retarded signal corresponding to said prefiltered signal, the retardation introduced by said first delay means exceeding by one sampling period a lag introduced by the series combination of said first threshold means and said first downstream filter means;

summing means with inputs connected to said first and second delay means to said filter downstream filter means for receiving said first and second retarded signals and said precursor-compensating signal therefrom, the retardation introduced by said second delay means causing simultaneous arrival of said first and second retarded signals at said summing means;

second threshold means connected to said summing means for deriving a second quantized pulse from the combination of signals received by said summing means;

second downstream filter means connected in a feedback loop between an output of said second threshold means and a further input of said summing means for delivering thereto a postcursor-compensating signal, derived from said second quantized pulse, with a delay of one sampling period;

third downstream filter means connected to said second threshold means for generating another precursor-compensating signal from said second quantized pulse;

third delay means in cascade with said first delay means for emitting a third retarded signal corresponding to said given signal sample;

fourth delay means in cascade with said second delay means for emitting a fourth retarded signal corresponding to said prefiltered signal, the retardations introduced by said third and fourth delay means being identical and exceeding by one sampling period a lag introduced by the series combination of said summing means, said second threshold means and said third downstream filter means;

adding means with inputs connected to said third and fourth delay means and to said third downstream filter means for receiving said third and fourth retarded signals and said other precursor-compensating signal therefrom;

third threshold means connected to said adding means for deriving a third quantized pulse from the combination of signals received by said adding means; and fourth downstream filter means connected in a feedback loop between an output of said third threshold means and a further input of said adding means for delivering thereto another postcursor-compensating signal, derived from said third quantized pulse, with a delay of one sampling period.

5. An equalizer as defined in claim 4, further comprising fifth downstream filter means inserted between said first threshold means and an additional input of said adding means for delivering thereto yet a further precursor-compensating signal derived from said first quantized pulse, the retardation introduced by the cascaded first and third delay means exceeding by two sampling periods a lag introduced by the series combination of said first threshold means and said fifth downstream filter means.

6. An equalizer for eliminating the effects of postcursor and precursor interference from a periodically sampled train of incoming digital signals, comprising:
receiving means connected to a transmission path carrying said incoming signals;
a first circuit branch including first delay means connected to said receiving means for emitting a first retarded signal corresponding to a given signal sample;
a second circuit branch connected in parallel with said first circuit branch to said receiving means, said second branch including upstream filter means for converting said given signal sample into a linearly prefiltered signal with at least partial suppression of precursor effects, said second branch further including second delay means connected to said upstream filter means for emitting a second retarded signal corresponding to said prefiltered signal;
first summing means with inputs connected to said first and second delay means for receiving said first and second retarded signals, the retardations introduced by said first and second delay means causing simultaneous arrival of said first and second retarded signals at said first summing means;
first threshold means connected to said first summing means for deriving a first quantized pulse from the combination of signals received by said first summing means;
first downstream filter means connected in a feedback loop between an output of said first threshold means and a further input of said first summing means for delivering thereto a first postcursor-compensating signal, derived from said first quantized pulse, with a delay of one sampling period;
second downstream filter means connected to said first threshold means for generating a precursor-compensating signal from said first quantized pulse;
third delay means in cascade with said first delay means for emitting a third retarded signal corresponding to said given signal sample;
fourth delay means in cascade with said second delay means for emitting a fourth retarded signal corresponding to said prefiltered signal, the retardations introduced by said third and fourth delay means being idenrical and exceeding by one sampling period a lag introduced by the series combination of said first summing means, said first threshold means and said second downstream filter means;
second summing means with inputs connected to said third and fourth delay means and to said second downstream filter means for receiving said third and fourth retarded signals and said precursor-compensating signal therefrom;
second threshold means connected to said second summing means for deriving a second quantized pulse from the combination of signals received by said second summing means; and
third downstream filter means connected in a feedback loop between an output of said second threshold means and a further input of said second summing means for delivering thereto a second postcursor-compensating signal, derived from said second quantized pulse, with a delay of one sampling period.

7. An equalizer as defined in claim 6, further comprising a decision stage in said first branch, connected to said receiving means in parallel with said first delay means, and fourth downstream filter means inserted between said decision stage and an additional input of said second summing means for delivering thereto another precursor-compensating signal derived from the output of said decision stage, the retardation introduced by the cascaded first and third delay means exceeding by two sampling periods a lag introduced by the series combination of said decision stage and said fourth downstream filter means.

* * * * *